March 14, 1950  J. T. AVARY  2,500,506
GARMENT FASTENER
Filed Nov. 10, 1945  2 Sheets-Sheet 1
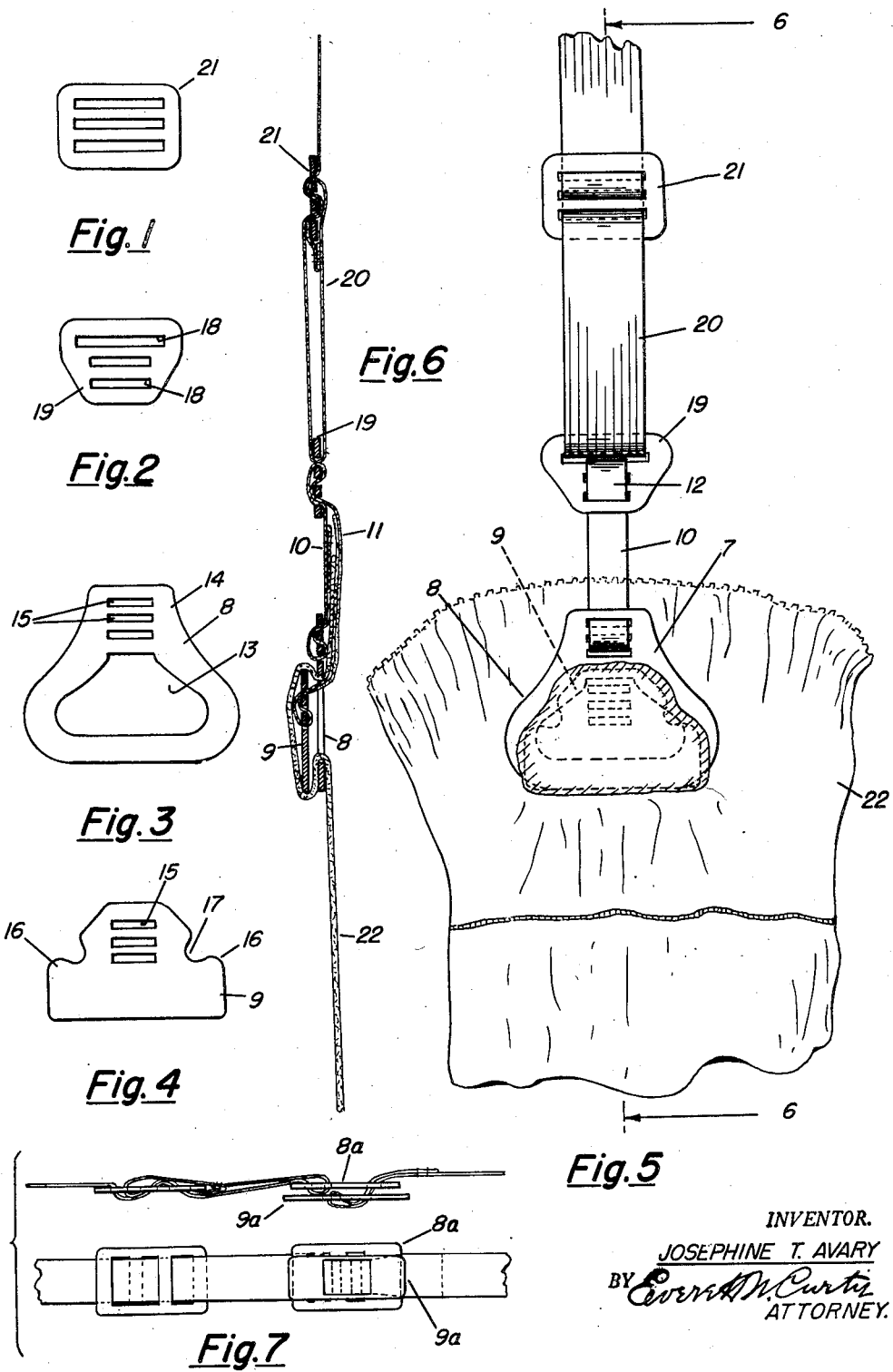
INVENTOR.
JOSEPHINE T. AVARY
BY Everett M. Curtis
ATTORNEY.

March 14, 1950    J. T. AVARY    2,500,506
GARMENT FASTENER
Filed Nov. 10, 1945    2 Sheets-Sheet 2
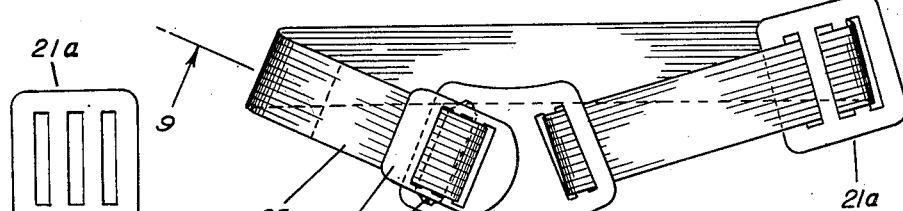
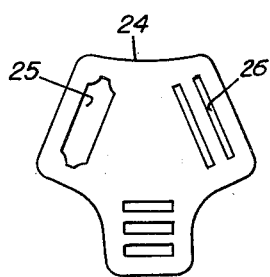
Fig. 10
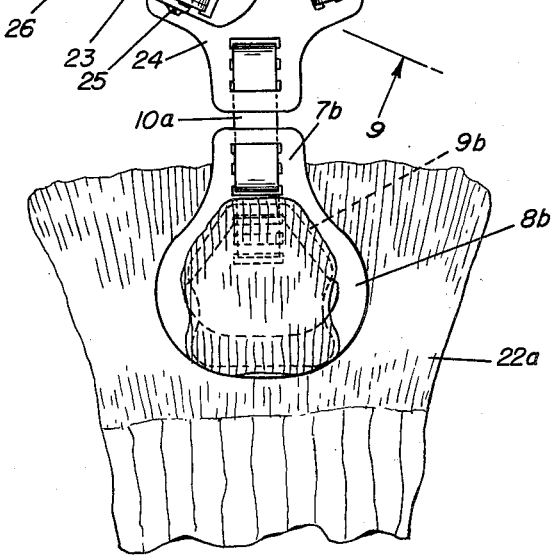
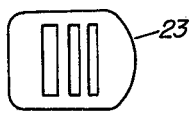
Fig. 11
Fig. 12
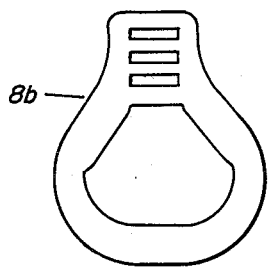
Fig. 8
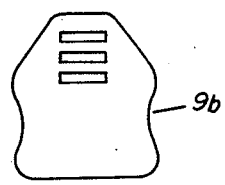
Fig. 13
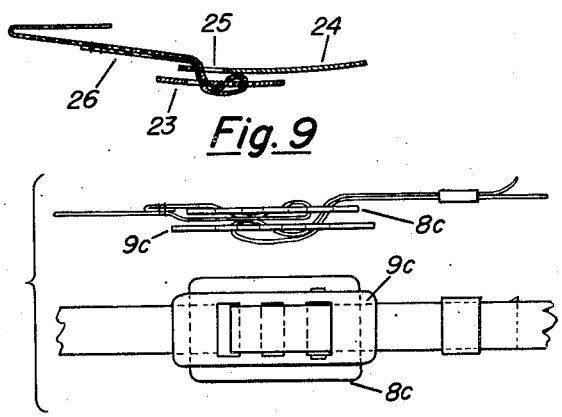
Fig. 9
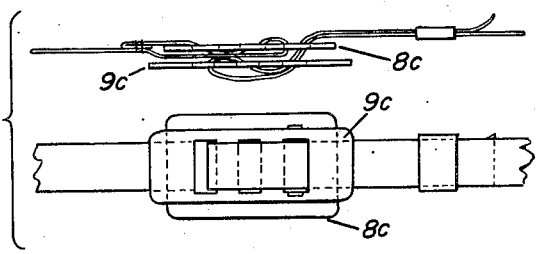
Fig. 15
Fig. 14
INVENTOR.
JOSEPHINE T. AVARY
BY Everett N. Curtis
ATTORNEY Patented Mar. 14, 1950

2,500,506

UNITED STATES PATENT OFFICE 2,500,506

GARMENT FASTENER

Josephine T. Avary, San Diego, Calif.

Application November 10, 1945, Serial No. 627,831

7 Claims. (Cl. 2—314)

My invention relates to garment fasteners, particularly adjustable clasp-locks for supporting hosiery or the like or for fastening belts, lingerie, underwear or other garments, and its objects are to afford a quick detachable fastener which, while providing a firm hold of the article to which it is attached, acts to reduce the usual wear and tear attendant upon the use of fasteners common in the art; to provide a ready means for adjusting the length of the strap or ribbon of the fastener and when so adjusted of locking the same in operative position; to allow ready renewal or replacement of parts to be made as occasion requires; to permit the fastener when coming in contact with any part of the human body to lie flat or to become form fitting thereon, and thereby to avoid wearing, unpleasant or annoying contacts; to bring about long life of the fastener notwithstanding constant and protracted use, and generally to provide a fastener which is simple and economical of construction, efficient in its action, and which will not readily deteriorate or get out of order.

My invention consists in improvements in supporting hosiery and the means of connection of such hosiery to a corset, girdle, belt or other wearing apparel.

My invention further consists in improvements in fastening ribbon straps to ladies' undergarments such as slips, brassières and chemises.

My invention further consists in improvements in men's and women's belt fasteners of adjustable lengths and of minimum bulk and thickness, including fasteners for ladies' undergarments known as panties which require an adjustable ribbon belt or slack tighteners.

My invention further consists in means for improving the supporting of hose for men through the novel construction of a garter attachment.

My invention further consists in means used in conjunction with braces or suspenders to replace the button and slitted strap in connection thereof.

My invention also consists in improved windings of the strap or ribbon of the fastener in the slotted pieces comprising elements thereof.

My invention also consists of other novel features of construction and combinations and arrangements of elements and parts hereinafter more particularly set forth and described.

Attention is hereby directed to the drawing, illustrating my invention as incorporated in different types of fasteners, in which similar numerals of designation refer to several parts throughout the several views, and in which—

Figure 1 is a plan view of the adjuster, or adapter plate, provided with three parallel slots for making lengthwise adjustments of the strap of the fastener;

Fig. 2 is a plan view of the connector, or intermediate plate, having one long and two shorter parallel slots for connecting a loop of the strap with the double strips of the band of the clasp;

Fig. 3 is a plan view of the stirrup member or base of the securing clasp provided with three parallel slots for connecting the same to one of the strips of the said band;

Fig. 4 is a plan view of the closure or stop member of said securing clasp, also provided with three parallel slots for separately connecting the same with the other strip of said band;

Fig. 5 is a plan view of an assembled fastener, adapted for use as a woman's garter, including the adjuster, connector, clasp and connecting strap and band, and showing the said fastener applied to the upper portion of a woman's stocking;

Fig. 6 is a side view of the said assembled fastener, showing one form of windings of the strap and band as applied to the parts of said fastener shown in Figs. 1 to 4;

Fig. 7 is a view of my improved fastener as applied to secure the ends of a belt;

Fig. 8 is a plan view of an assembled fastener adapted for use as a man's garter, including the adjuster, connector, clasps and connecting strap and band, and showing the said fastener applied to a man's stocking;

Fig. 9 is a section on line 9—9 of Fig. 8, through the upper closure and adjacent connections;

Fig. 10 is a plan view of the adjuster member shown in Fig. 8, showing the same detached therefrom;

Fig. 11 is a plan view of the connector shown in Fig. 8, showing the same detached therefrom;

Fig. 12 is a plan view of the upper closure member shown in Fig. 8, showing the same detached therefrom;

Fig. 13 is a plan view of the stirrup member shown in Fig. 8, showing the same detached therefrom;

Fig. 14 is a plan view of the lower closure member detached from the view shown in Fig. 8, and Fig. 15 is a plan and side elevation showing a simplified form of the improved fastener shown in Fig. 7.

All of the solid parts of my fastener shown in the drawing are cut or stamped out of, or formed from, solid sheet material such as sheet metal, or sheets of plastic, bone, Celluloid, hard rubber, wood, fiber, or any other suitable material having sufficient tensile strength for the purpose. Such parts may, however, be otherwise formed or shaped provided they act to serve the same function or purpose, and are mechanical equivalents of corresponding elements, of my invention. Also all of such parts are provided with a set of three closely associated parallel slots, through which may be threaded the strap and band connecting said parts. Each of these slots is of elongated rectangular shape, and has its length slightly less than the width of the strap or band to be inserted therein, and its breadth of sufficient size to allow at least two thicknesses of material to be inserted to pass therethrough; the said straps or bands being of fabric, leather or other suitable flexible material, and being elastic or non-elastic in character.

Referring to the drawing, the securing clasp 7 is shown as comprised of two members or parts, 8 and 9, respectively, secured to the ends of the connected strips 10 and 11 of the band 12. As shown, the member 8 is in the form of a flattened stirrup or bow having a comparatively large transverse opening 13 therein, and having its top portion extended to form a lift 14 provided with one of the sets of parallel slots 15 above referred to. The member 9 is in the form of a flattened disc and is of such contour that while it may readily pass, or be turned to pass, through the opening 13, it will nevertheless after such passage, when in its normal position act upon withdrawal as a closure or stop for said opening 13. As shown in Fig. 4, the said member 9 is made to conform to the requirements of a garter applied as a support of a woman's stocking 22, and is illustrated in Fig. 5 as being enveloped by the upper portion of the fabric of such stocking and as drawn into arrested and abutting contact with the face of said stirrup 8, the said fabric intervening therebetween; such connection of parts serving to lock the same together and to act as a clasp suspending the stocking in desired position. When used for a woman's stocking, I provide the member 9 with the rounded shoulders 16 and the hollows 17 to prevent tearing or slipping of the fabric thereover, particularly in the case of rayon hosiery. However, such specific construction is not required for other purposes of my invention, since any shape or form of the member 9 may be employed provided it is capable of the closure herein set forth. For supporting the members 8 and 9 in operative position, the band 12 is threaded through the slots 18 of the connector 19; so as to form depending therefrom the two aforesaid end strips 10 and 11; the latter of which is made somewhat longer than the former to allow extension of the closure member 9 through the opening 13 in the stirrup member 8.

In order to form adequate connection, between the band 12 and strap 20, I form the connector 19 with the upper slot somewhat longer than the two lower slots; so as to allow engagement with the loop of said strap, which as shown is somewhat wider than the band 12; and to provide a means for adjusting the length of the strap I employ the adjuster 21, provided with a set of three slots to and through which the strap may be threaded and attached, and adjustments made as desired.

Through the provision of a set of three slots in each of the several parts of my invention having the length and breadth shown in Figs. 1 to 4, inclusive, I am enabled, through a great variety of windings of strap or band, to secure a much better means of attachment and adjustment of band and strap than I believe has heretofore been disclosed in the art. An example of such windings is shown in Fig. 6, in which the great advantage of this number of slots, and the benefit of the breadth of slot allowing double thicknesses of material to be used, is evident; it being apparent that such construction permits various types of windings or adjustments such as friction or cinch engagements, or catch windings, and sliding or slip contacts to bring about such advantages and benefits.

As shown the said parts of my improved fastener are made flat and as obvious they may also be made curvilnear in form so that such parts may tend to lie flat or tend to conform with any part of the human body with which they come in contact, and to prevent chafing or other annoyance. Also the said parts readily lend themselves to being made in ornamental or artistic forms, without impairing their functional use.

Also as is obvious the general arrangement of the stirrup and closure elements of my invention, without substantial change, could be used for fastening ladies' slip straps and brassière straps, ladies' and men's belts, men's suspenders, and for men's garters in connection with the usual and elastic tape around the leg, or for any strap connection used with wearing apparel. In Fig. 7, I have shown my improved fastener as adapted for use for securing together the ends of a belt; the member 8a corresponding to the stirrup member 8, shown in Fig. 3, and the member 9a corresponding to the closure member 9 shown in Fig. 4, and the said members 8a and 9a being attached in the same manner as the members 8 and 9 as indicated in Fig. 5, without however, the intervention of any fabric therebetween. Also in Figs. 8 to 14, inclusive, I have shown an assemblage of parts, showing my improved fastener adapted for use as a support for a man's stocking, the general arrangement being similar to that shown in Fig. 5, except that the connector 24 has been modified to allow a double connection of the encircling band 26; one end of said band being provided with the upper closure member 23 engaging with the slot 25, and the other end of said band engaging with slots 26, and except that the stirrup 8b and the lower closure 9b have been rounded and changed as shown to meet the requirements of the heavier fabric present in men's stockings. Also in Fig. 15, I have simplified the belt fastener shown in Fig. 7 by combining in one member 8c the functions of the adjuster 21 and the connector 19.

By the words "ribbon," or "ribbon band," as used in the claims, I desire to be understood as meaning to include strips of fabric, leather, or any other material suitable for the purposes of my invention.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the above description, and all changes which come within the meaning and range of equivalency of the claims are therefore intended to be embraced therein.

What I claim and desire to secure by Letters Patent is:

1. In a garter, the combination of a flattened stirrup, a separable flattened closure disc having rounded shoulders laterally protruding therefrom and shaped upon turning on one side to pass completely through the opening of said stirrup and, upon being covered by the fabric of the stocking and turned back to upright position and attempted withdrawal, to make arrested and abutting contact with said stirrup, and a flexible ribbon the ends of which are respectively affixed to said stirrup and disc and become fastened together and to said stocking; the said shoulders acting to hold the said fabric firmly in position and to prevent slipping thereof.

2. In a garter, the combination of a flattened stirrup, a separable flattened closure disc having rounded shoulders laterally protruding therefrom and shaped upon turning upon one side to pass completely through the opening of said stirrup, and upon being covered by the fabric of said stocking and turned back to upright position and attempted withdrawal to make arrested and abutting contact with said stirrup, both said stirrup and disc having a set of three closely associated parallel slots extending therethrough; and a flexible ribbon band, the ends of which are respectively threaded through and secured in the slots of said stirrup and disc and become fastened together upon the operation of said attachment; the said shoulders acting upon contact to hold said fabric firmly in position and to prevent slipping thereof.

3. A belt fastener, comprising a strap, a flattened stirrup affixed to one end of said strap, and a closure disc secured to the other end of said strap, said disc being shaped to pass completely through the opening of said stirrup and upon attempted withdrawal to become attached thereto, both said stirrup and strap having a set of three closely associated parallel slots extending therethrough and serving to secure the respective ends of said strap and the winding of said strap around one, or both, of these parts being made readily adjustable by allowing sufficient play in the slots to manipulate the winding easily to change the length of said belt.

4. A belt fastener, comprising an adjuster, a strap threaded therethrough, a flattened stirrup fastened to one end of said strap, and a closure disc secured to the other end of said strap, said disc being shaped to pass completely through the opening of said stirrup and upon attempted withdrawal to become attached thereto; the adjuster, stirrup and disc each having a set of three closely associated parallel slots extending therethrough for engagement with said strap.

5. A belt fastener, comprising an adjuster, a strap threaded therethrough, a flattened stirrup fastened to one end of said strap, and a closure disc secured to the other end of said strap, said disc being shaped to pass completely through the opening of said stirrup and upon attempted withdrawal to become attached thereto; the adjuster, stirrup and disc each having a set of three closely associated parallel slots extending therethrough for engagement with said strap, and the winding of said strap around one, or both, of these parts being made readily adjustable by allowing sufficient play in the slots to manipulate the winding easily to change the length of said belt.

6. In a man's garter, the combination of a flattened stirrup, a separable flattened closure disc having rounded shoulders and shaped upon turning on one side to pass completely through the opening of said stirrup and, upon being covered by the fabric of the stocking and turned back to upright position and attempted withdrawal, to make arrested and abutting contact with said stirrup, and a flexible ribbon the ends of which are respectively affixed to said stirrup and disc and become fastened together and to said stocking; the said shoulders acting to hold the said fabric firmly in position and to prevent slipping thereof.

7. In a man's garter, the combination of a flattened stirrup, a separable flattened closure disc shaped upon turning upon one side to pass completely through the opening of said stirrup, and upon being covered by the fabric of said stocking and turned back to upright position and attempted withdrawal to make arrested and abutting contact with said stirrup, both said stirrup and disc having a set of three closely associated parallel slots extending therethrough; and a flexible ribbon band, the ends of which are respectively threaded through and secured in the slots of said stirrup and disc and become fastened together upon the operation of said attachment; the said shoulders acting upon contact to hold said fabric firmly in position and to prevent slipping thereof.

JOSEPHINE T. AVARY.

REFERENCES CITED

The following references are of record in the file of this patent:

UNITED STATES PATENTS

| Number | Name | Date |
| --- | --- | --- |
| 897,911 | Lorentz | Sept. 8, 1901 |
| 1,701,453 | Hirsh | Feb. 5, 1929 |
| 2,094,292 | Cousens | Sept. 28, 1937 |
| 2,224,773 | Shaulson | Dec. 10, 1940 |

FOREIGN PATENTS

| Number | Country | Date |
| --- | --- | --- |
| 9,087 | Great Britain | Sept. 20, 1841 |
| 355,731 | Germany | July 1, 1922 |
| 365,995 | Italy | Dec. 16, 1938 |